United States Patent Office 2,803,664

Patented Aug. 20, 1957

2,803,664

PREPARATION OF TRICHLOROPHENYLALKYL ETHERS

Horace E. Redman, Baton Rouge, La., assignor to Ethyl Corporation, New York, N. Y., a corporation of Delaware No Drawing. Application October 14, 1954, Serial No. 462,371

3 Claims. (Cl. 260—612)

This invention relates to a process for preparing trichlorophenylalkyl ethers from tetrachlorobenzene and more particularly, but not exclusively, to the preparation of 2,4,5-trichloroanisole from 1,2,4,5-tetrachlorobenzene.

The trichlorophenylalkyl ethers are important and valuable commercial products which find numerous uses both as intermediates and as final products. For example, 2,4,5-trichloroanisole is employed as an insecticide, plasticizer, plant growth regulator and as a fungicide. These nuclear halogenated phenylalkyl ethers have superior dielectric and insulating characteristics and find much use as dielectric liquids in transformers, electric capacitors, electric cables and the like. The most widely used technique for their manufacture is by the chlorination of the corresponding phenylalkyl ether or the lower chlorinated derivatives thereof. In this process, difficulty separable mixtures of the various tri- and other polychlorophenylalkyl ether isomers are obtained. The alkaline treatment of 1,2,4,5-tetrachlorobenzene in the presence of methyl alcohol at pressures of the order of 600 to 800 p. s. i. to produce 2,4,5-trichloroanisole has already been disclosed in the prior art. Similarly, U. S. Patent 2,072,797 also describes a process for preparing these nuclear halogenated phenylalkyl ether compounds wherein a mixture of an aryl halogenated compound with an aliphatic alcohol is heated in a closed space in the presence of an alkali and a minor proportion of a cupreous reagent, e. g. cuprous chloride, at elevated temperatures. These prior processes, however, are deficient in that the reaction conditions employed require the use of special high pressure equipment and result in an undesirably low yield of the desired product. Further, the high temperatures, i. e. above 210° C., and long reaction times, i. e. four hours or more, required for these processes result in the simultaneous production of considerable quantities of chlorophenolic compounds and tarry decomposition products which not only decrease the yield of the trichlorophenylalkyl ethers obtained therefrom, but also complicate their separation and recovery from the reaction mixture.

It is accordingly an object of this invention to provide an improved process for the manufacture of trichlorophenylalkyl ethers. Another object of this invention is to provide a process in which trichlorophenylalkyl ethers can be manufactured from tetrachlorobenzene. Still another object is to provide a process for the manufacture of 2,4,5-trichloroanisole from 1,2,4,5-tetrachlorobenzene. A further object is to provide a process of the above type which can be conducted with cheaper and simpler equipment than is required by the prior art processes and which does not result in the formation of any appreciable amount of chlorophenolic and tarry decomposition products. Other objects and advantages of this invention will be apparent from the following description and appended claims.

It has now been found that trichlorophenylalkyl ethers can be prepared in high yields when tetrachlorobenzene is reacted with a critical proportion of an alcoholic alkali metal hydroxide solution at lower reaction temperatures and shorter reaction times than has heretofore been employed to effect such a reaction. More specifically, the invention comprises reacting tetrachlorobenzene with critical proportions of an alcoholic alkali metal hydroxide solution at a temperature between about 80° and 180° C. under the vapor pressure of the reaction mixture at this temperature and for a suitable period, i. e. not more than about 2.5 hours, which period is inversely related to the molar proportion of alkali metal hydroxide and/or the reaction temperature employed. The conversion of tetrachlorobenzene to high yields of high quality trichlorophenylalkyl ethers under these reaction conditions is indeed unexpected, since the prior art would lead one to believe that an appreciable formation of phenolic compounds would result from such a process.

In general, the process can be conducted by heating a mixture of an alkali metal hydroxide and tetrachlorobenzene present in the molecular proportions of between 0.8:1.0 and 2.3:1.0 respectively, in the presence of an aliphatic monohydric alcohol and at an elevated temperature between about 80° and 180° C. The reaction mixture is heated at this temperature for a suitable period, i. e. 0.5 to 2.5 hours, and at a reactor pressure equivalent to the vapor pressure of the reaction mixture at the temperature employed. The trichlorophenylalkyl ether formed thereby can be isolated in accordance with known procedures. For example, the reaction mixture can be contacted with water to precipitate the desired product as a solid which can be separated, washed and dried or otherwise purified. The remaining aqueous layer is fractionally distilled to recover any unreacted alcohol contained therein. Alternatively, if the desired product is a liquid, the reaction mixture is subjected to distillation operations to recover the product in a purified state.

As pointed out above, the proportion of alkali metal hydroxide to tetrachlorobenzene employed in the reaction is of great importance. Generally, a range between about 0.8:1.0 and 2.3:1.0, hydroxide:tetrachlorobenzene has been found satisfactory for obtaining a desirable degree of conversion to the trichlorophenylalkyl ether. Under optimum conditions, however, it is preferred to use a mole ratio between about 1.0:1.0 to 1.5:1.0, hydroxide:tetrachlorobenzene in order to obtain maximum conversion to high quality trichlorophenylalkyl ethers. The use of a lesser proportion of alkali metal hydroxide than 0.8:1.0 generally leads to incomplete reaction of the tetrachlorobenzene to the desired ether, while a greater proportion than 2.3:1.0 promotes the decomposition of the product and the concurrent formation of undesired phenolic compounds and tarry by-products.

Various alkali metal hydroxides are useful for this reaction. Generally sodium hydroxide is preferred because of its availability and low cost, but potassium hydroxide or lithium hydroxide can also be utilized.

Aliphatic monohydric alcohols containing from one to six carbon atoms can generally be employed in the process of this invention for the preparation of the corresponding trichlorophenyl-alkyl ethers. The lower alcohols, such as methyl and ethyl alcohol, are particularly effective in the operation of this process. Examples of other alcohols which are equally operable are propanol-1, propanol-2, butanol-1, butanol-2, methylpropanol-1, pentanol-1, pentanol-2, pentanol-3, 2-methylbutanol-1, 2-methylbutanol-3, 2-methylbutanol-4, dimethylpropanol, hexanol-1, hexanol-2, hexanol-3 and the like. The proportion of alcohol employed in a particular reaction although not critical is of some importance. Generally, it is desirable to employ at least a sufficient amount of alcohol, above the stoichiometric concentration, which will dissolve the reactants. In general, this condition is satisfied when the solvent is present in a quantity sufficient to provide a 5 to 25 percent by weight solution of the hydroxide. The use of an alcoholic alkali metal hydroxide solution in this concentration range is conducive to a moderate and controllable reaction and aids in eliminating the formation of local hot spots which result in the degradation of products and reactants to the undesirable phenolic compounds or tarry by-products. The unreacted alcohol is readily recovered by direct distillation from the reaction mixture following the separation of the product.

The temperature for the conversion of the tetrachlorobenzene to trichlorophenylalkyl ethers while not critical is important and materially improved results are obtained when temperatures below about 180° C. are employed. Generally, it has been found that temperatures between about 80° and 180° C. and preferably between about 125° and 160° C. give the best conversions of tetrachlorobenzene to the trichlorophenylalkyl ether. Reaction temperatures below about 80° C. lead to the incomplete conversion of the tetrachlorobenzene to the desired ether. On the other hand, temperatures above 180° C. result in the formation of complete or appreciable quantities of phenolic compounds, as well as the removal of a plurality of chlorine atoms from the tetrachlorobenzene molecule to give polyethers and an unsatisfactory yield of the trichlorophenylalkyl ether. The latter impurities complicate the separation and recovery of the desired product. Moreover, temperatures above 180° C. also result in the formation of tarry by-products which further reduce the yield and quality of the trichlorophenylalkyl ethers obtained.

The reaction time required for the process is surprisingly low. It has been found when any of the above reactants are employed in the molar proportions and at the reaction temperatures described above, the reaction is substantially complete within a reaction time of about 2.5 hours or less and additional time appreciably degrades the desired product. As pointed out above, the reaction time is generally contingent upon the molar proportion of alkali and/or on the reaction temperature employed. Thus, when employing a high molar proportion of alkali, i. e. 2.3:1.0, and/or a high reaction temperature, i. e. about 180° C., it is desirable to subject the reaction mixture to a relatively short reaction time, i. e. not more than about 1 hour, in order to obtain a maximum conversion of the tetrachlorobenzene to the desired ether and the minimum formation of undesirable by-products. Conversely, a low molar proportion of alkali, i. e. 0.8:1.0, and/or a low reaction temperature, i. e. about 80° C., require a longer reaction time, i. e. about 2.5 hours, for the same desirable results. In general, reaction times between the range of 0.5 and 2.5 hours and preferably between 1.0 and 2.0 hours have been found to be most satisfactory for the operation of this process under optimum conditions.

The pressure under which the above process is carried out is not particularly critical. Normally, it is preferred to heat the reaction mixture in a closed system whereby the pressure buildup amounts to the vapor pressure of the reaction mixture at the temperature employed. This is particularly advantageous in the use of the lower boiling alcohols since it permits the realization of the desired reaction temperatures which may be above the boiling point of the particular alcohol. When employing the higher boiling alcohols suitable for this process, it is possible to operate in an open system at atmospheric pressure conditions provided that the boiling point of the alcohol is at or above the desired reaction temperature. When operating in the above described manner, pressures between about atmospheric and 28 atmospheres and preferably between about 6.2 and 17 atmospheres can be suitably employed. In general, the use of higher pressures is less desirable since they require special complex and expensive high pressure equipment in which to conduct the reaction.

The following examples are not intended as limitations to this invention, but only as illustrations thereof.

*Example I*

A mixture of 1,2,4,5-tetrachlorobenzene (1 mole), sodium hydroxide (2.2 moles) and methyl alcohol (15 moles) was charged to a high pressure autoclave equipped with an agitator. The agitated reaction mixture was heated at a temperature of 140° C. and a pressure of 157 p. s. i. g. for a period of one hour. The reaction mixture was then discharged from the reactor and contacted with ten times its volume of distilled water to precipitate a solid material which after washing with water and drying was identified as 2,4,5-trichloroanisole by its melting point and chlorine analysis. The yield was 84.0 percent of theory of high quality 2,4,5-trichloroanisole.

*Example II*

This example illustrates the detrimental effect resulting from heating the reaction mixture for an excessive period, i. e. more than 2.5 hours. In this example, the procedure of Example I is repeated except that the reaction mixture was maintained at the reaction temperature, i. e. 140° C., for about three hours. The product was worked up as in Example I and the yield of 2,4,5-trichloroanisole obtained was only 8.1 percent of theory.

*Example III*

The excellent results obtained when employing a smaller proportion of alkali metal hydroxide, lower temperatures and pressures, and increased reaction time is illustrated in this example. The apparatus of Example I is employed in this example, but the reaction conditions are varied. Thus, the reactants of Example I are employed in similar molar proportions except that only 1.1 mole of sodium hydroxide is used. Also, a reaction temperature of 130° C. and a pressure of 90 p. s. i. g. is employed. The reaction mixture is heated at this temperature for two hours and then discharged from the reactor and worked up as in Example I. The yield of 2,4,5-trichloroanisole in this example is greater than 90 percent of theory.

*Example IV*

When the procedure of Example I is again repeated, this time substituting potassium hydroxide for the sodium hydroxide, substantially identical results are obtained.

Equally good results are obtained when molar proportions of alkali metal hydroxide to tetrachlorobenzene as low as 0.8:1.0 and as high as 2.3:1.0 are employed. Similarly, reaction temperatures as high as 180° C. and as low as 80° C. give results comparable to those obtained in the above example.

When 1,2,3,4-tetrachlorobenzene and 1,2,3,5-tetrachlorobenzene are employed in the place of 1,2,4,5-tetrachlorobenzene, in the above examples, similar results are obtained.

Although the use of methyl alcohol is shown in the above examples, other alcohols such as ethyl alcohol, propanol-1, propanol-2, butanol-1, butanol-2, pentanol-1, dimethylpropanol, hexanol-1, and hexanol-3 give equally good conversions of tetrachlorobenzene to the corresponding trichlorophenylalkyl ether.

As noted above, high quality trichlorophenylalkyl ethers, such as 2,4,5-trichloroanisole, can now be produced in yields as high as 90 percent or higher. The process comprises reacting tetrachlorobenzene with an aliphatic monohydric alcohol in the presence of a critical proportion of an alkali metal, i. e. 0.8:1 to 2.3:1, alkali: tetrachlorobenzene, at a temperature not above about 180° C. and for a reaction period not longer than about 2.5 hours. Further, the duration of the reaction period is inversely related to the molar proportion of alkali metal hydroxide and/or the reaction temperature employed. The process of this invention, as contrasted with prior processes, does not require the use of costly and complex pressure equipment and also economically produces a high quality product in excellent yield by a relatively simple process operation.

I claim:

1. An improved process for the preparation of trichlorophenylalkyl ethers which comprises reacting a tetrachlorobenzene with an alkali metal hydroxide and an aliphatic monohydric alcohol containing from about 1 to 6 carbon atoms at a reaction temperature between about 80 and 180° C., said alkali metal hydroxide and tetrachlorobenzene being present in a mole ratio between about 0.8:1.0 and 2.3:1.0, said alcohol being present in a quantity sufficient to form a 5 to 25 percent solution by weight of said alkali metal hydroxide, terminating said reaction after a period of from about 0.5 to about 2.5 hours the time being inversely related to the molar proportion of alkali metal hydroxide and the reaction temperature, and thereafter recovering trichlorophenylalkyl ethers therefrom.

2. The process of claim 1, wherein the tetrachlorobenzene is essentially 1,2,4,5-tetrachlorobenzene, the alkali metal hydroxide is sodium hydroxide, and the monohydric alcohol is methyl alcohol.

3. The process of claim 1 further defined wherein the reaction temperature is between about 125° and 160° C. and the mole ratio of the alkali metal hydroxide and tetrachlorobenzene is between about 1.0:1.0 and 1.5:1.0.

References Cited in the file of this patent

UNITED STATES PATENTS 2,578,853 Stevenson ------------- Dec. 18, 1951

FOREIGN PATENTS 411,052 Germany -------------- Mar. 23, 1925